May 28, 1963   V. S. PENOTE ET AL   3,091,044
DIGGER TOOTH

Filed Oct. 28, 1960   6 Sheets-Sheet 1

INVENTORS
VINCENT S. PENOTE AND
BY HENRY L. MEYER

Teare & Fetzer
ATTORNEYS

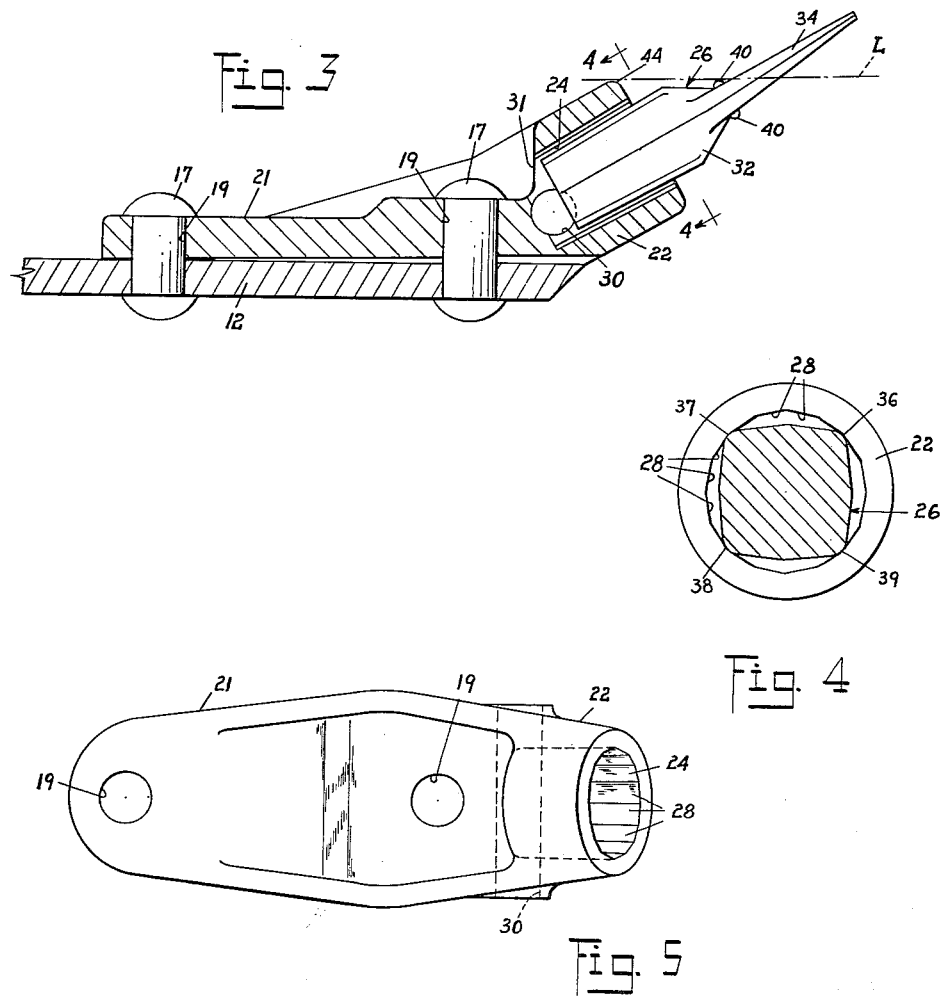

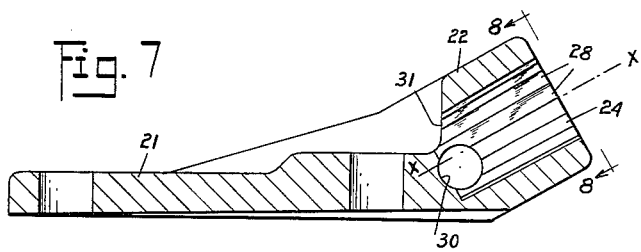
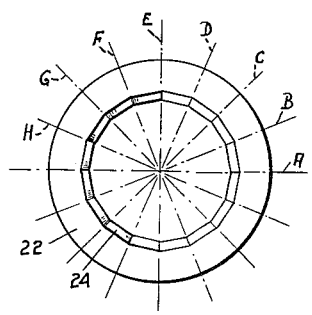
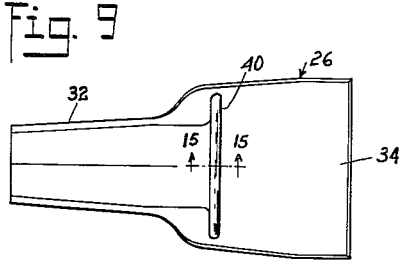
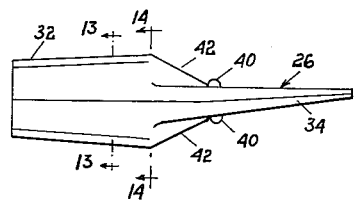
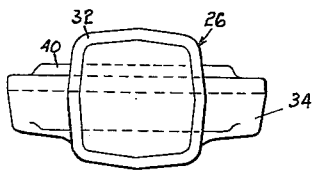
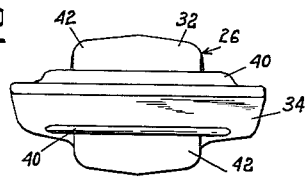
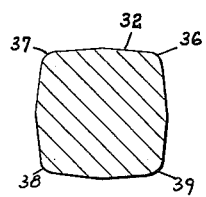
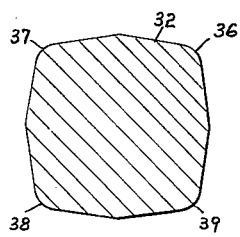
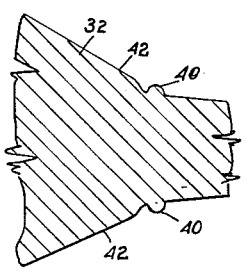
INVENTORS
VINCENT S. PENOTE AND
BY HENRY L. MEYER
Teare & Teare
ATTORNEYS

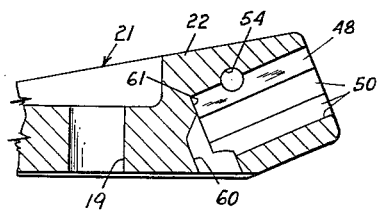
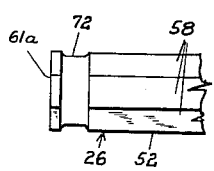
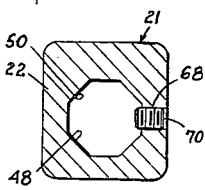
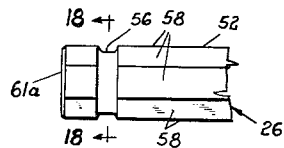
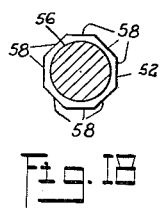
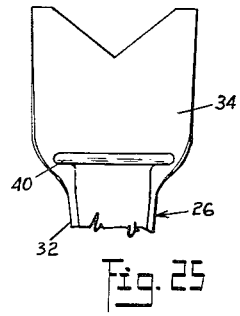
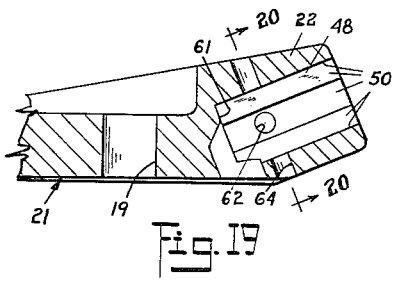
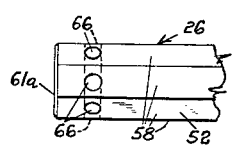
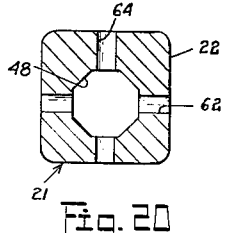
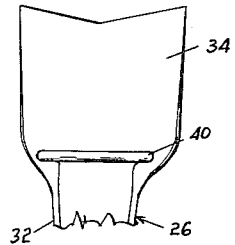
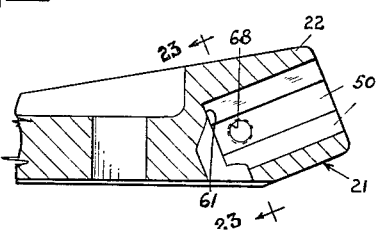
INVENTORS
VINCENT S. PENOTE AND
HENRY L. MEYER
BY Teare & Fetzer
ATTORNEYS May 28, 1963 V. S. PENOTE ET AL 3,091,044
DIGGER TOOTH
Filed Oct. 28, 1960 6 Sheets-Sheet 5

INVENTORS
VINCENT S. PENOTE AND
HENRY L. MEYER
BY
Teare & Fetzer
ATTORNEYS

INVENTORS
VINCENT S. PENOTE AND
HENRY L. MEYER

BY Teare + Fetzer
ATTORNEYS

United States Patent Office 3,091,044
Patented May 28, 1963

3,091,044
DIGGER TOOTH
Vincent Stephen Penote, Shaker Heights, and Henry L. Meyer, Cleveland Heights, Ohio, assignors to The Cleveland Trencher Company, Cleveland, Ohio, a corporation of Ohio
Filed Oct. 28, 1960, Ser. No. 65,817
5 Claims. (Cl. 37—142)

This invention relates to an improved digger tooth, and more particularly to those having replaceable tips, adapted for use on the cutting edges of buckets of power driven excavating machines, mining machinery and the like, and particularly those machines of the continuous digging type as distinguished from those types, such as a power shovel, which have an interrupted digging cycle.

Excavating machines used for ditching or trenching are intended to produce an excavation of a predetermined size, the width of the excavation being generally governed by the size of the scoops or buckets used to remove the material being dug. Machines of this type are usually provided with teeth set around the lips of the buckets of the digging unit, such teeth being held in place by suitable fastening means, and generally so arranged as to be removable from the respective bucket. In service, these teeth wear and become dull and inefficient in the digging operation, and thus require replacement. The cutting edges of the teeth of prior art arrangements are generally oriented so that such cutting edges extend transversely of the tooth and in generally parallel relation to the work surface being dug.

The present invention provides a multi-part digger tooth construction wherein the cutting element or cutting tip of the tooth may be selectively rotated or moved from the generally parallel relation of the cutting edge to the work, to a plurality of angled positions with respect to the lengthwise axis of the cutting tip. When digging in hard, consolidated material, such as coral rock, slate, and the like, if the blades are rotated from their generally parallel position, say for instance 90°, a relatively narrow cross section of cutting edge is produced which will have great penetration characteristics, and by positioning other teeth on following buckets in various predetermined angular relationships around the respective bucket, small particles of the work surface may be chipped away with each revolution of the digging unit.

Accordingly an object of the invention is to provide a digging tooth arrangement with a removable cutting tip element, wherein the positional orientation of the latter with respect to the tooth base may be selectively changed.

Another object of the invention is to provide a digging tooth of the latter mentioned type which includes means on the separable cutting tip element to visually indicate when the tooth should be replaced due to the wearing thereof.

A more specific object of the invention is to provide a digging tooth arrangement comprising a base member having a projecting portion thereon receiving in holding coaction a projecting portion of a separable cutting tip member, and including means on said portions providing for selective rotary orientation of the tip member through a plurality of angled positions about the lengthwise axis of the tip member.

Other features and advantages of the invention will be apparent from the following description taken in conjunction with the accompanying drawings wherein:

FIG. 3 is an elevational, sectional view of the digger tooth as mounted on a bucket, with the separable cutting tip being illustrated in full;

FIG. 4 is a fragmentary sectional view taken substantially along the plane of line 4—4 of FIG. 3, looking in the direction of the arrows;

FIG. 5 is a top plan view of the base member of the multiple part digging tooth assembly;

FIG. 6 is an end elevational view taken from the right hand side of FIG. 5;

FIG. 7 is a sectional, elevational view of the FIG. 5 showing;

FIG. 8 is a fragmentary view taken generally along the plane of line 8—8 of FIG. 7, looking in the direction of the arrows, and illustrating with dot-dash lines various possible positions of the front cutting edge of the separable tip member of the digging tooth assembly;

FIG. 9 is a top plan view of the chisel-like, separable cutting tip member of the digger tooth assembly;

FIG. 10 is a side elevational view of the FIG. 9 showing;

FIG. 11 is an enlarged rear end elevational view taken from the left hand side of FIG. 10;

FIG. 12 is an enlarged front end elevational view of the separable cutting tip element, taken from the right hand side of FIG. 10;

FIG. 13 is an enlarged vertical sectional view taken generally along the plane of line 13—13 of FIG. 10;

FIG. 14 is a super enlarged vertical sectional view taken generally along the plane of line 14—14 of FIG. 10;

FIG. 15 is an enlarged fragmentary, vertical sectional view taken generally along the plane of line 15—15 of FIG. 9, looking in the direction of the arrows;

FIG. 16 is a reduced size, fragmentary, vertical sectional view of a modified form of the base or holder member of the tooth;

FIG. 17 is a fragmentary, side elevational view of the removable cutting tip element shank for use with the FIG. 16 base member;

FIG. 18 is a vertical sectional view taken generally along line 18—18 of FIG. 17, looking in the direction of the arrows;

FIG. 19 is a view generally similar to FIG. 16, but illustrating a further modification of the base member;

FIG. 20 is a transverse sectional view taken generally along line 20—20 of FIG. 19, looking in the direction of the arrows;

FIG. 21 is a view generally similar to that of FIG. 17, but illustrating a modified form of the cutting tip element shank for use with the FIG. 19 base member;

FIG. 22 is a view generally similar to FIG. 16, but illustrating another modification of the base member;

FIG. 23 is a transverse sectional view taken generally along line 23—23 of FIG. 22, looking in the direction of the arrows;

FIG. 24 is a view generally similar to that of FIG. 17, but illustrating a modified form of the cutting tip element shank for use with the FIG. 22 base member;

FIGS. 25 through 34 are plan views of various configurations of the chisel-like head portion of the removable cutting tip element of the tooth;

Figure 1:
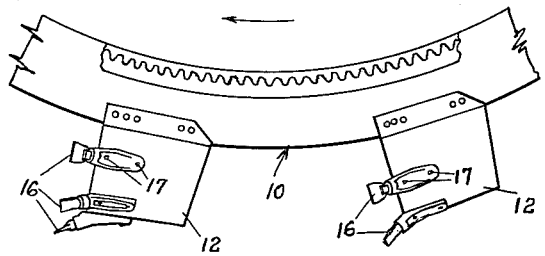
FIG. 1 is a fragmentary side elevational view of a portion of an excavating or digging wheel, having excavating buckets thereon provided with digger teeth of the instant invention.
Figure 2:
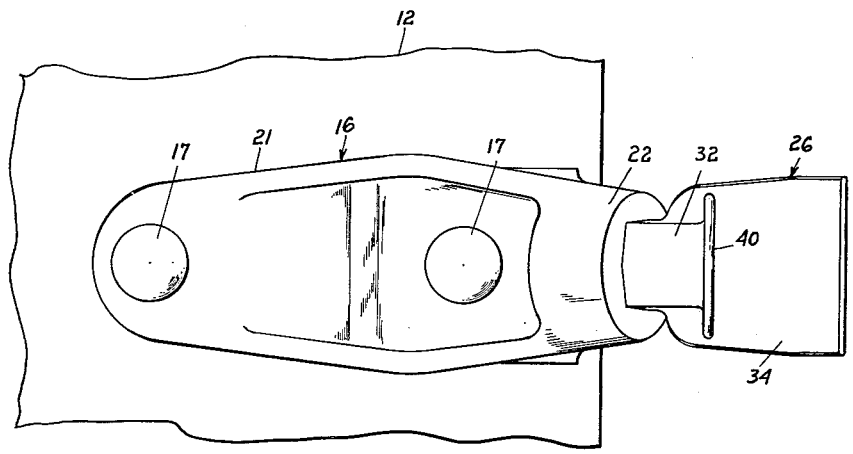
FIG. 2 is an enlarged, top plan view of the multiple part digger tooth of the invention.
Figure 27:
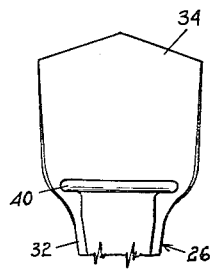
Figure 28:
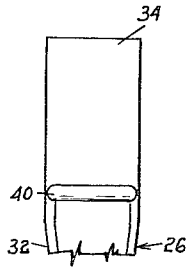
Figure 29:
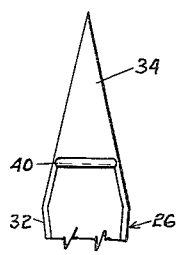
Figures 30, 31:
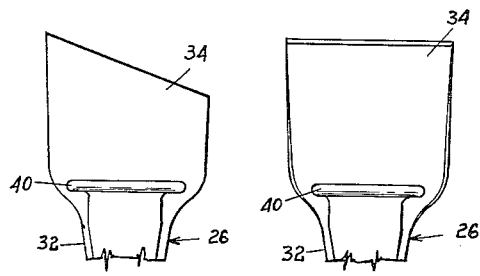
Figure 32:
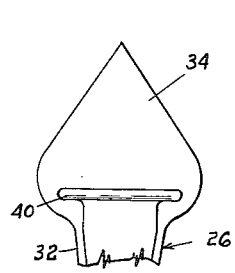
Figure 33:
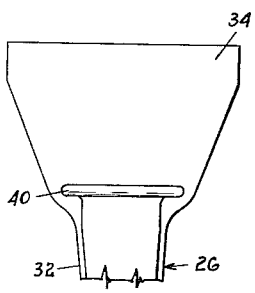
Figure 34:
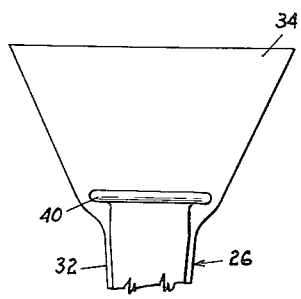

Referring again to the drawings, there is indicated at 10 (FIG. 1) a portion of an excavating unit provided with excavating buckets 12. The machine itself may be of the general type shown in United States Patent No. 2,280,004, issued April 14, 1942 to Vincent S. Penote, et al. Suitable mechanism (not shown) rotates the excavating unit 10 in the direction of the arrow in FIG. 1, so that the forward edges of the excavating buckets will engage the material being excavated.

The improved rooter or digging tooth 16 is shown as being applied to the buckets 12 by bolts or rivets 17 which pass through suitable openings 19 (FIG. 3) in the tooth base 21, and through aligned openings in the mounting wall of the respective bucket 12. The tooth base 21 has a forwardly projecting portion 22 connected thereto and extending angularly therefrom, as can be best seen in FIGS. 3 and 7 of the drawings. Portion 22 has, in the embodiment illustrated, a socket 24 therein, such socket being adapted to receive a complementary portion of a removable cutting tip element 26.

In accordance with the invention, the interior of socket 24 is defined by a plurality of equal planar surfaces 28, giving a polygonal configuration to the socket interior. Such surfaces 28 are also preferably disposed in tapered relation to the lengthwise axis X—X (FIG. 7) of the socket, to provide a tapered wedging fit between the cutting tip element and the socket, in the assembled condition of the tooth. In the embodiment illustrated, there are sixteen of such surfaces 28 provided. The base portion of the tooth is also provided with a transversely extending opening 30 therethrough, which is disposed in communication with the inner end of the socket 24, and an opening 31 is provided in the rear end of the socket, for providing access to drive the cutting tip element 26 out of the socket.

Referring now to FIGS. 9 through 15, the removable cutting tip element 26 comprises a body portion 32, and a cutting head portion 34, with such head portion being of generally flattened chisel-like configuration. The body portion 32 is generally symmetrical about the lengthwise axis of the cutting tip element, and embodies in the arrangement illustrated, four working corners 36, 37, 38 and 39 (FIGS. 13 and 14). The body portion 32 of the removable cutting tip element is tapered complementary to the aforementioned taper of the socket 24 in the base member, thereby insuring the aforementioned wedging coaction between the separable cutting tip element and the base member, and providing for maintaining the cutting tip element in assembled relation with the base member. From FIG. 4, it can be seen that in the assembled condition of the tip element in the base member 21, the working corners 36, 37, 38 and 39, which are preferably of generally rounded contour, are received in wedging coaction with the interior surfaces 28 of the socket 24 at the junctures of such surfaces.

Referring now to FIG. 8, it will be seen that with such an arrangement, the cutting tip element can be assembled in a plurality of positions with respect to the base socket member. In this connection in FIG. 8, dot-dash line A represents the conventional generally horizontal position of the outer cutting edge of the separable cutting tip element with respect to the underlying bucket and the work surface to be excavated, while reference lines B through H represent other possible rotated positions of the cutting tip element with respect to the socket. It will be seen therefore that the tip element may be selectively positioned to produce a variety of widths of effective cutting area of the tip during movement of the excavating unit. Therefore, when the unit is operating in relatively hard soil, such as coral, shale, and the like, the cutting tip elements can be so angled on their respective buckets as to provide a wearing or chipping away of the hard material with each revolution of the digging wheel. Also if the cutting tips 26 are merely utilized in the conventional parallel relation of the cutting edge with the work surface, as the cutting edge becomes dull through usage, the tips may be removed and re-installed at 180° to the original position, thus presenting a new sharp cutting edge, resulting in greatly increasing the efficiency of the excavating operation. It is known in the art to laterally stagger the teeth about alternate buckets, as shown in FIG. 1, so that substantially the entire transverse width of a trench to be excavated may be engaged by the rooter teeth on a predetermined series of buckets, thereby reducing the number of teeth required because of the overlapping effect of the cutting edges of the teeth, and resulting in a greater concentration of the power of the digging unit and the weight of the machine on the teeth provided for each bucket. It will be seen that the present invention considerably improves this effect by introducing the ability to attack the work being excavated from a multiplicity of angles and effective cutting areas of the separable cutting tip elements.

Furthermore, in accordance with the instant invention, means is provided on the head portion 34 of the tooth which will indicate the point of wear of the cutting tip element at which it is no longer effective. This means, in the embodiment illustrated, takes the form of protuberances 40 disposed on opposite sides of the head portion, generally adjacent the sloping surfaces 42 of the shank or body portion of the tip element. Referring now in particular to FIG. 3, L designates the line of the path of movement of the tooth base on a wheel type excavating unit, and it will be seen that when the cutting tip element has worn down to approximately line L, the free end of the cutting tip element is just barely providing clearance for the following outer edge 44 of the tooth base. If the worn cutting tip element is allowed to remain in the socket, wear of the protuberances 40 will occur. The protuberances 40 project out a sufficient distance to line L so that the outer protuberance will commence to wear, before the tip of the cutting element wears to an amount that would permit undue wearing of corner 44 on the tooth base. Such wear on the protuberance 40 will be apparent to a machine operator upon inspection of such teeth, which will then indicate to the operator that it is time to replace the cutting tip element. It will be seen therefore that the instant invention also provides visual indicating means for positively warning a machine operator that the cutting tip elements are no longer effective in providing clearance for the following components of the tooth assembly.

Referring now to FIGS. 16 to 18, there is illustrated a modification of the invention. In this modification, the inner surfaces of the socket 48 of the tooth base 21 are not tapered, as in the first described embodiment, and are shown as including eight equal planar surfaces 50. The shank or body portion 52 of the removable cutting tip element 26 is complementary formed to socket 48, being octagonal in cross sectional configuration, as best seen in FIG. 18, and thus is adapted to be readily received in preferably snug relation in socket 48. In order to retain the tip element in assembled relation with the base member 21 of the tooth, a transversely extending opening 54 is provided, as shown, extending into the socket area. The cutting tip shank 52 is provided with a circumferentially extending groove 56 which is adapted to receive the lower portion of a retainer pin (not shown) extending through opening 54, to interlock the cutting tip to the base member. Opening 54 preferably extends completely through both sides of portion 22 of the base member 21 so that the retainer pin can be inserted and removed from either side of the tooth assembly. The retainer pin may be of any suitable type, as for instance a tapered pin for wedging holding coaction in opening 54 or may be of the cotter key type embodying means on either end thereof for retaining the pin in assembled relation with base member 21. It will be seen that with the arrangement illustrated, the surfaces 58 on the shank 52 of the cutting tip may be disposed in generally confronting relation with the corresponding surfaces 50 defining the socket 48, and that the cutting tip may be rotated about its lengthwise axis to a plurality of positions upon removal from the socket, thereby changing the orientation of the front cutting edge of the tip member with respect to the work, and that the transverse opening 54 in the base member, the retainer pin, and the circumferential groove 56 in the shank 52 of the tip member, provides for selective rotary orientation of the tip member, while also providing for retaining the tip member in assembled relation in the socket, and against withdrawal movement therefrom. As shown, the base member 21 is preferably provided with an opening 60 on its underside, which communicates with the socket 48. The inner end 61 of the socket may provide an abutment for engagement with the end 61a of the shank for aligning groove 56 with opening 54.

FIGS. 19 to 21 illustrate a further modification wherein portion 22 of the base member 21 is provided with transverse and generally vertically extending openings 62 and 64 respectively therethrough, and the shank 52 of the tip member 26 is likewise provided with a plurality of through openings 66 which are adapted for alignment with openings 62, 64, for receiving a removable retaining pin or pins, and thus interlock the tip member to the base member.

FIGS. 22 to 24 illustrate a further modification wherein a threaded opening 68 is provided in portion 22 of the base member, which opening communicates with socket 48 and receives a set screw 70 therein for holding coaction with circumferential groove 72 formed adjacent the end of shank 52 of the tip member.

Figure 35:
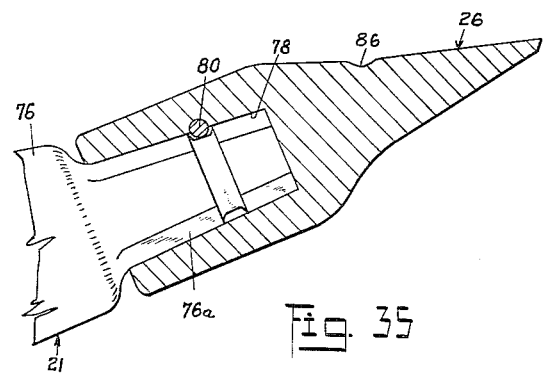
FIGS. 35 through 37 are enlarged, fragmentary, partially sectioned, side elevational views of three modifications of the tooth assembly, wherein the socket portion is formed in the rearward end of the removable cutting tip element, and the coacting shank portion is formed on the tooth base member, instead of vice versa, as in the previously mentioned embodiments.
Figure 36:
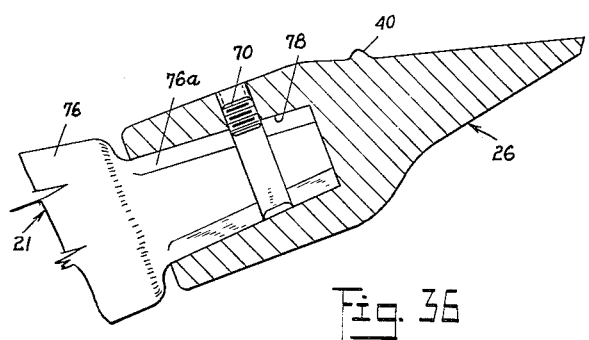
Figure 37:
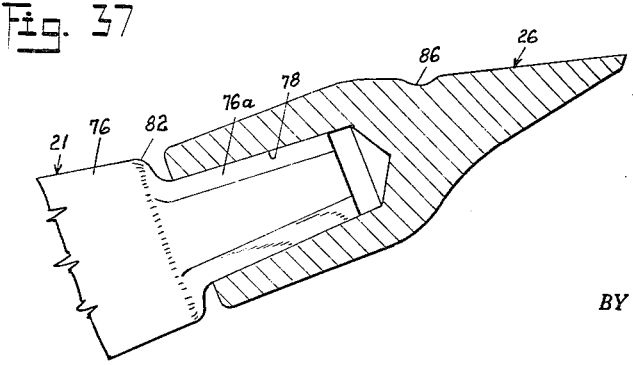

Referring now to FIGS. 35 through 37, there is illustrated various modifications wherein the projecting portion 76 of the tooth base comprises a shank portion 76a, and the removable tip element comprises a socket 78 in its rearward end. The defining surfaces of the shank and socket respectively define a polygonal configuration in transverse cross section similar to the aforediscussed embodiments, and particularly similar to the FIGS. 16 to 24 embodiments, and thus the tip member's cutting edge may be selectively oriented with respect to the work by removal of the tip and rotating it about its lengthwise axis to the desired position, and then reinstalling it on the base member.

In FIG. 35, the tip member is held in assembled position on the base member by a retaining pin 80 and in a generally similar manner as aforediscussed in connection with the FIGS. 16 to 18 embodiment. In FIG. 36, the tip member is held on the base member 21 by set screw 70, and in a generally similar manner as aforediscussed in connection with the FIGS. 22 to 24 embodiment. In FIG. 37, the tip member is held assembled with the base member by a wedging coaction between tapered surfaces on the shank 76a and tapered surfaces defining the socket 78 in the tip member. Shoulder 82 may provide a fulcrum for driving or prying the tip element off of the shank.

As shown in FIGS. 35 to 37, means is also provided on the tip member to indicate the point of wear wherein it it desirable to replace the tip member. This means in FIGS. 35 and 37 is illustrated as a depression 86 extending transversely across the tip member, which when the tip wears down generally along line L (FIG. 3) close to or to the depression, will indicate that the tooth tip should be replaced. In FIG. 36 the warning means is illustrated as a protuberance 40, generally similar to that aforedescribed in connection with the FIGS. 9 to 15 embodiment.

From the foregoing discussion and accompanying drawings it will be seen that the invention provides an improved rooter tooth assembly embodying a removable cutting tip element which may be rotated to a plurality of predetermined angular relationships with respect to the lengthwise axis of the tip element for greatly increasing the efficiency of the cutting tip element, and especially when operating in hard soils, such as coral and the like, and greatly increases the usable life of the cutting tip element. The invention also provides means for indicating to a machine operator when the cutting tip element is no longer effective and should be replaced.

Although the invention has been illustrated upon a bucket in connection with a wheel-type trencher, it is to be understood that the invention is applicable to a digging bucket on any form of excavating machine such as a chain or bucket type.

The terms and expressions which have been used are used as terms of description and not of limitation, and there is no intention in the use of such terms and expressions of excluding any equivalents of the invention shown or described, or portions thereof, but it is recognized that various modifications are possible within the scope of the invention claimed.

We claim:

1. In an endless digging unit for a mobile excavating machine including a plurality of excavating buckets secured to the outer boundary of said unit and having digger teeth secured to the leading edges of said buckets and projecting forwardly therefrom, the digger teeth on said buckets being arranged so that the digger teeth on one bucket are spaced laterally of the digger teeth on the next following bucket so that substantially the entire transverse width of a trench to be excavated may be engaged by the digger teeth on a predetermined series of said buckets, each of said digger teeth comprising a base member secured to the respective bucket and having a projecting portion thereon, a detachable cutting tip member having a flattened blade-like tip and having a projecting portion, one of said projecting portions defining a socket and the other of said projecting portions defining a shank received in engaged relation in said socket, the interior of said socket being comprised of a plurality of surface sections disposed in abutting relation at their lengthwise edges and providing a generally polygonal shaped configuration in vertical section for said socket, said shank being of generally polygonal shaped configuration in vertical section but having a lesser number of surface sections as compared to the number of surface sections of said socket, said tip member being adapted to be selectively oriented into a plurality of rotatively angled positions about the lengthwise axis of said tip member, said plurality of positions being of greater number than said surface sections of said tip member, and means interlockingly securing said tip member to said base member.

2. In an endless digging unit for a mobile excavating machine including a plurality of excavating buckets secured to the periphery of said unit and having digger teeth secured to the leading edges of said buckets and projecting forwardly therefrom, the digger teeth on said buckets being arranged so that the digger teeth on one bucket are spaced laterally of the digger teeth on the next following bucket so that substantially the entire transverse width of a trench to be excavated may be engaged by the digger teeth on a predetermined series of buckets, each of said digger teeth comprising a base member having a projecting portion thereon, said projecting portion having a socket therein, the interior of said socket being comprised of a plurality of planar surface sections disposed in abutting relation at their lengthwise extending edges to form a polygonal shaped configuration in vertical section for said socket, a removable tip element mounted in said socket, said tip element comprising a shank portion received in said socket in engaged relation and a head portion defining a flat cutting blade for said tip element, said shank being of polygonal shaped configuration in vertical section but having a lesser number of surface sections as compared to the number of said surface sections in said socket, the lengthwise edges of said shank portion being of rounded configuration and with certain of said edges being disposed in abutting relation with certain of the junctures of said surface sections of said socket, said defining surfaces of said socket being tapered outwardly in a forward direction and said edges of said shank portion being complementary tapered to the taper of said socket whereby said tip element is held in wedging coaction in said socket, said tip element being selectively orientable into a plurality of rotatively angled positions about the lengthwise axis of said tip element, said plurality of positions being of a greater number than the number of rounded edges of said shank portion whereby said cutting blades may attack the material to be excavated from a multiplicity of cutting tip angles.

3. A multiple part digging tooth comprising a base member having a projecting portion, said projetcing portion having a socket therein, the interior of said socket being comprised of a plurality of generally planar surface sections disposed in abutting relation at their lengthwise edges to form a polygonal shaped configuration in vertical section for said socket, a removable tip member detachably mounted in said socket, said tip member comprising a shank portion received in engaged relation in said socket and a head portion defining a flat cutting blade for said tip member, said shank portion being of polygonal shaped configuration in vertical section but having a lesser number of surface sections as compared to the number of said surface sections of said socket, the lengthwise corners of said shank portion being of rounded configuration and being adapted for engagement with certain of the surface sections of said socket at the junctures thereof, the defining surfaces of said socket being tapered outwardly in a forward direction and said corners of said shank portion being complementary tapered to the taper of said socket, whereby said tip member is held in wedging coaction in said socket, said tip member being adapted to be selectively oriented into a plurality of rotatively angled positions about the lengthwise axis of said tip member, said plurality of positions being of a greater number than the number of corners of said shank portion.

4. A multiple part digging tooth for a bucket equipped excavator comprising a base member having a projecting portion, said projecting portion having a socket therein, the interior of said socket being comprised of a plurality of generally planar surface sections disposed in abutting relation at their lengthwise edges to form a generally polygonal shaped configuration in vertical section of solely obtuse angles for said socket, a removable tip member mounted in said socket, said tip member comprising a shank portion received in said socket in engaged relation and a head portion defining a flat cutting blade for said tip member, said shank portion being of generally polygonal shaped configuration in vertical section but having a lesser number of surface sections as compared to the number of said surface sections of said socket, said tip member being adapted to be selectively oriented into a plurality of rotatively angled positions about the lengthwise axis of said tip member, said plurality of positions being of a greater number than the number of surface sections of said tip member, and means detachably holding said tip member interlocked to said base member, said means for holding said tip member interlocked with said base member comprising an arrangement wherein said projecting portion has at least one opening extending transversely therethrough in communication with said socket, and said shank portion has an aperture extending therethrough from each of its defining surfaces.

5. A mutiple part digging tooth for an excavator comprising a base member having a projecting portion thereon, a detachable cutting tip member including a head defining a cutting blade for said tip member and having a projecting portion, one of said projecting portions having a socket therein and the other of said projecting portions defining a shank received in engaged relation in said socket, the interior of said socket being comprised of a plurality of surface sections disposed in abutting relation at their lengthwise edges to form a generally polygonal shaped configuration in vertical section for said socket, said shank being of a generally polygonal shaped configuration in vertical section but having a lesser number of surface sections as compared to the number of said surface sections of said socket, said tip member being adapted to be selectively oriented into a plurality of rotatably angled positions about the lengthwise axis of said tip member, said plurality of positions being of a greater number than the number of surface sections of said shank, means for holding said tip member detachably interlocked to said base member, and wherein said cutting blade is of flattened configuration disposed forwardly of the projecting portion of said tip member and is adapted to cut a clearance path in the material to be excavated for the leading end of said base member during an excavating operation, and means on said tip member for visually indicating when the cutting tip member becomes worn to the point of ineffectiveness, the last mentioned means comprising a protuberance of predetermined height on the outer surface of said blade, said protuberance extending transversely of said outer surface and being disposed intermediate the forward and rearward extremities of said blade, said protuberance being adapted to commence to wear when said blade is worn down to a point where it will no longer provide clearance for said base member.

References Cited in the file of this patent

UNITED STATES PATENTS

| | | |
|---|---|---|
| 33,506 | Chaffee et al. | Oct. 15, 1861 |
| 447,776 | Islin | Mar. 10, 1891 |
| 792,761 | Duncan | June 20, 1905 |
| 1,333,852 | Kittredge | Mar. 16, 1920 |
| 1,685,196 | Gilbert | Sept. 25, 1928 |
| 1,862,337 | Emrick | June 7, 1932 |
| 1,909,850 | Younie | May 16, 1933 |
| 2,040,085 | Fykse | May 12, 1936 |
| 2,319,464 | Massa | May 18, 1943 |
| 2,321,352 | Askue | June 8, 1943 |
| 2,360,315 | Campbell et al. | Oct. 17, 1944 |
| 2,666,273 | McIninch | Jan. 19, 1954 |
| 2,709,860 | Helton | June 7, 1955 |
| 2,815,692 | Daniels | Dec. 10, 1957 |